US010397389B2

(12) United States Patent
Zouaoui et al.

(10) Patent No.: US 10,397,389 B2
(45) Date of Patent: Aug. 27, 2019

(54) METHOD, APPARATUS AND SYSTEM FOR EXCHANGING A DATA COMMUNICATION VIA AN AUDIO CONNECTOR

(71) Applicant: INTEL CORPORATION, Santa Clara, CA (US)

(72) Inventors: Alaeddine Zouaoui, Roquefort les Pins (FR); Pascal Khair, Toulouse (FR); Charles Jernigan, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/500,847

(22) PCT Filed: Aug. 13, 2014

(86) PCT No.: PCT/IB2014/002431
§ 371 (c)(1),
(2) Date: Jan. 31, 2017

(87) PCT Pub. No.: WO2016/024143
PCT Pub. Date: Feb. 18, 2016

(65) Prior Publication Data
US 2017/0223167 A1    Aug. 3, 2017

(51) Int. Cl.
*H04B 1/20*    (2006.01)
*H04M 1/725*   (2006.01)

(52) U.S. Cl.
CPC ........ *H04M 1/72527* (2013.01); *H04B 1/207* (2013.01)

(58) Field of Classification Search
CPC ............... H04M 1/0274; H04M 15/68; H04M 1/72527; H04M 2215/00;
(Continued)

(56) References Cited

U.S. PATENT DOCUMENTS

2004/0131086 A1    7/2004  Alvarado et al.
2009/0179768 A1    7/2009  Sander et al.
(Continued)

FOREIGN PATENT DOCUMENTS

EP    2677727 A1    12/2013
WO    2013/112411 A1    8/2013

OTHER PUBLICATIONS

International Preliminary Report on Patentability for PCT Patent Application No. PCT/IB2014/002431 dated Feb. 23, 2017. 7 pages.
(Continued)

*Primary Examiner* — Golam Sorowar
(74) *Attorney, Agent, or Firm* — Womble Bond Dickinson (US) LLP

(57) ABSTRACT

Techniques and mechanisms for exchanging information between a mobile device and another device which is to serve as an accessory to the mobile device. In an embodiment, the accessory device and the mobile device are coupled to one another via an audio connector of the mobile device. The mobile device receives via the audio connector encoded signals which represent, in a first frequency range, information generated by a sensor of the accessory device. The first frequency range is within an audible frequency range and outside of a telephony frequency range of the mobile device. In another embodiment, the encoded signals are provided to telephony logic of the host device during a telecommunication exchange between the host device and a remote device. Due to its representation in the first frequency range, some sensor information is prevented from being represented as an audio signal in the telecommunication exchange.

25 Claims, 6 Drawing Sheets

(58) Field of Classification Search
CPC . H04M 2215/0176; H04M 2215/0196; H04M 2215/32; H04M 1/0254; H04M 1/21; H04M 2250/04; H04M 1/0202; H04M 1/0216; G06Q 20/322; G06Q 20/10; G06Q 20/32; G06Q 20/202; G06Q 20/40; G06Q 20/382; G06Q 20/3278; G06Q 20/04; G06Q 20/3224; G06Q 20/4012; G06Q 20/02; G06Q 20/12; G06Q 20/3226; G06Q 20/027; G06Q 20/3829; G06Q 20/385; G06Q 20/20
See application file for complete search history.

(56) References Cited

U.S. PATENT DOCUMENTS

| | | | | |
|---|---|---|---|---|
| 2010/0158260 A1* | 6/2010 | Huddart | ............... | H04R 5/04 381/56 |
| 2010/0217100 A1* | 8/2010 | LeBoeuf | ............... | A61B 5/11 600/301 |
| 2011/0259957 A1* | 10/2011 | Tsai | ............... | G06K 19/0711 235/380 |
| 2011/0301435 A1* | 12/2011 | Albert | ............... | A61B 5/0404 600/301 |
| 2013/0183646 A1* | 7/2013 | Lusted | ............... | G09B 19/00 434/236 |
| 2013/0278896 A1* | 10/2013 | Pham | ............... | G06K 7/084 351/204 |
| 2014/0061309 A1* | 3/2014 | Cho | ............... | H04M 1/21 235/441 |
| 2014/0067381 A1* | 3/2014 | Li | ............... | H04N 21/4398 704/201 |

OTHER PUBLICATIONS

International Search Report and Written Opinion received for PCT Patent Application No. PCT/IB2014/002431, dated Apr. 29, 2015, 9 pages.

* cited by examiner

METHOD, APPARATUS AND SYSTEM FOR EXCHANGING A DATA COMMUNICATION VIA AN AUDIO CONNECTOR

CROSS-REFERENCE TO RELATED APPLICATION

This patent application is a U.S. National Phase Application under 35 U.S.C. § 371 of International Application No. PCT/IB2014/002431, filed Aug. 13, 2014, entitled METHOD, APPARATUS AND SYSTEM FOR EXCHANGING A DATA COMMUNICATION VIA AN AUDIO CONNECTOR.

BACKGROUND

1. Technical Field

The present invention relates generally to data communication. Certain embodiments relate more particularly, but not exclusively, to systems and methods to encode signals for communicating data between devices.

2. Background Art

Mobile phones and other telephony-capable devices typically provide Bluetooth®, Wireless Fidelity Direct (or Wi-Fi Direct™), Near Field Communication (NFC), Apple Lightning™, Universal Serial Bus (USB) and/or any of various other wired or wireless connection mechanisms. While they variously support communications representing audio information, these connection types each have respective advantages and disadvantages in terms of ubiquity, data rates, power distribution, etc.

One connection type—colloquially referred to as an "audio jack," "phone jack," "mic input" etc.—is ubiquitous for a wide variety of computers, mobile phones, tablets, etc. However, connections of this type are usually designed for, and limited to, communication of analog signals representing sound that is audible to the human ear (roughly, in the range of 20 Hz to 20 kHz).

As successive generations of mobile devices continue to scale, and as the applications for such mobile devices continue to grow in complexity and variety, there is an increasing need for resources of these mobile devices to provide additional or alternative functionality in support of such applications.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed herein variously provide techniques and/or mechanisms for communicating data to a host device from another device (referred to herein as an accessory device) which is to supplement functionality of the host device. The host device may include telephony logic configured to conduct telephone communications with another telephony-capable device that, for example, is remote from the host device and the accessory device.

The accessory device may be operable to transmit first signals to an audio input of the host device—e.g. where the first signals are provided as input to the telephony logic. Some or all of the first signals may reside within a first frequency range which, for example, is within a frequency range for sound which is audible to the human ear. Receipt of the first signals via the audio input of the host device may be concurrent with a telephony session between the host device and another device. The telephony logic may output second signals for the telephony session, wherein the second signals represent audio within a second frequency range—e.g. where the second frequency range is also within the frequency range for sound audible to the human ear. In an embodiment, the telephony logic receives the first signals and filters some or all of the first signals to generate the second signals. For example, the first frequency range may be at least partially outside of (e.g. higher and/or wider than) the second frequency range.

Figure 1:
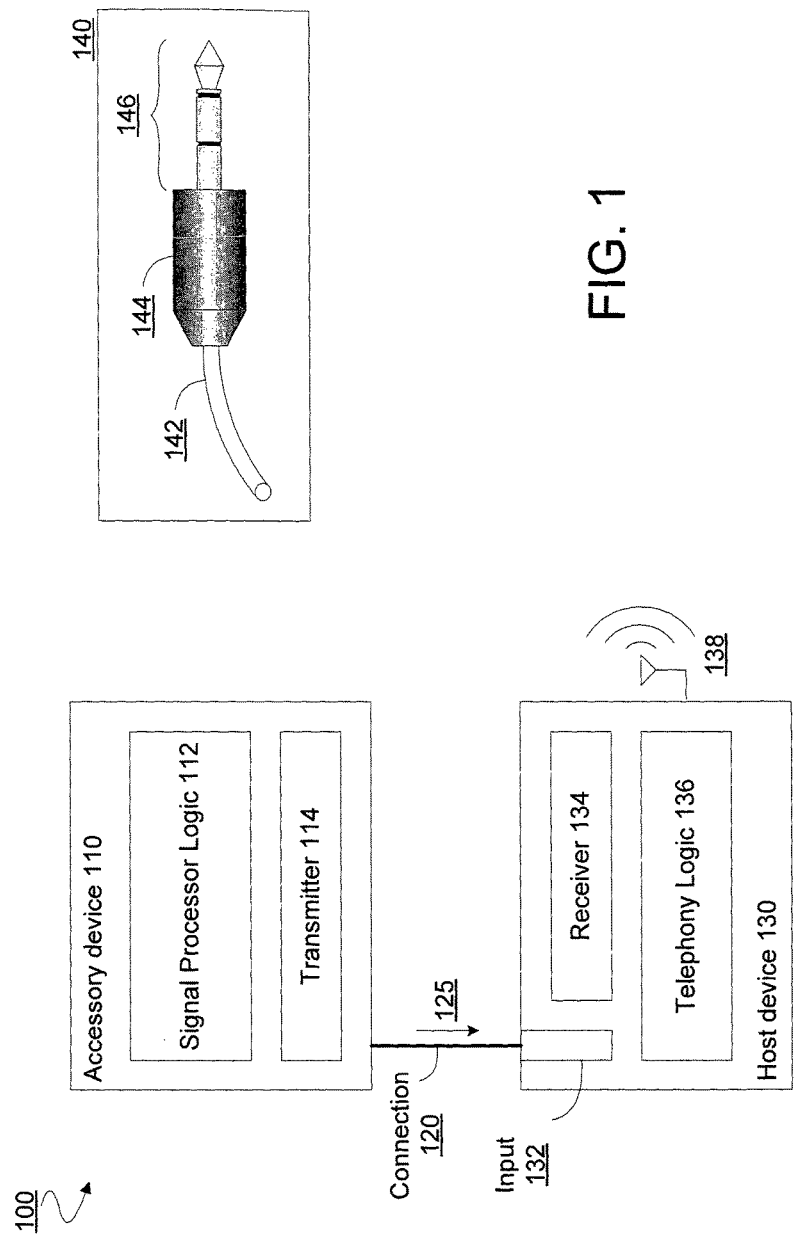
FIG. 1 is a functional block diagram illustrating elements of a system for communicating data via an audio connector according to an embodiment.

FIG. 1 illustrates elements of a system 100, according to an embodiment, for communicating data via an audio connector. System 100 includes an accessory device 110 and a host device 130 coupled thereto via a connection 120. Accessory device 110 may be operable as a peripheral for host device 130—e.g., where accessory device 110 may be manually coupled to and/or decoupled from host device 130 prior to or during runtime operation of host device 130. In an embodiment, accessory device 110 includes circuit logic—e.g. comprising hardware, firmware and/or executing software—to process signals 125 in preparation for transmission to host device 130. For example, accessory device 110 may comprise signal processor logic 112 configured to process signals received from sensor logic (not shown) included in or coupled to accessory device 110. Based on such processing, a transmitter 114 of accessory device 110 may receive an output from signal processor logic 112, and generate corresponding signals 125 for transmission via connection 120.

Although certain embodiments or not limited in this regard, signals 125 may represent information other than one or more types of audio information. For example, signals 125 may represent information generated by a sensor other than a microphone of accessory device 110—e.g. wherein accessory device 110 does not include any such microphone. By way of illustration and not limitation, accessory device 110 may include sensor logic configured to detect a state of the user and/or an environment of a user—e.g., where accessory device 110 is wearable by the user. In such an embodiment, some or all of signals 125 may represent biometric information (such as a heartbeat, body temperature, blood pressure, brain wave activity and/or the like) or temperature, humidity, radiation, atmospheric pressure or other environmental information. Alternatively or in addition, accessory device 110 may include magnetic (or other) sensor logic to perform scanning of a credit card, RFID tag or other such device. In some embodiments, signals 125 include both microphone information and non-microphone information. Certain embodiments are not limited with respect to a particular type of non-microphone information processed by signal processor logic 112.

Signals 125 may be received from accessory device 110 via an audio connector of host device 130, as represented by the illustrative input 132. As used herein, "audio connector" refers to any of a variety of types of connector hardware (male or female, input and/or output) that is capable of supporting communication of signals representing audio information. More particularly, an audio connector may be capable of supporting communication of analog, non-packetized signals within a range of frequencies equal to the range of frequencies for sound that is audible to the human ear. Such a range of frequencies may include some or all of a range from 20 Hz to 20 kHz, for example.

In an embodiment, an audio connector is of a standardized connector type for exchanging microphone (e.g., headphone) audio information. By way of illustration and not limitation, input 132 may include female connector hardware of a type that is capable of supporting communication of signals representing mono sound—e.g. wherein input 132 is to receive a 2.5 mm TS (tip, sleeve) male connector or a 3.5 mm TS male connector. Alternatively, female connector hardware of input 132 may be of a type that is capable of supporting communication of signals representing stereo sound—e.g. wherein input 132 is to receive a 3.5 mm TRS (tip, ring, sleeve) male connector or a 6.35 mm TRS male connector. Alternatively, input 132 may be such a male connector for communicating stereo and/or mono audio information, e.g., wherein input 132 is to be plugged into female connector hardware (not shown) of accessory device 110.

Inset 140 shows an example of one such male connector, wherein a housing 144 is located at terminal end of cable 142, and wherein a single pin structure 146 extends from housing 144. The pin structure 146 may include sleeve and tip structures—and in some embodiments, one or more ring structures—to variously provide, according to conventional mechanisms, respective contacts for a reference potential (e.g. ground) line and one or more signal lines. In some embodiments, such a pin structure may include one or more contacts for providing power between devices—e.g. from host device 130 to accessory device 110.

A receiver 134 of host device 130 may receive the signals 125 provided via input 132. In an embodiment transmitter 114 and receiver 134 comprise conventional transmitter/receiver mechanisms and functionality such is that typically used for exchanging analog audio information generated by a microphone, headphones and/or the like. Device 130 may comprise telephony logic 136 configured to participate in a telecommunication exchange between host device 130 and another device (not shown). For example, host device 130 may comprise a mobile phone (e.g. a smart phone) capable of participating in such an exchange via the illustrative antenna 138 and other wireless communication hardware (not shown) of host device 130.

Telephony logic 136 may comprise hardware, firmware and/or executing software to support such a telecommunication exchange—e.g., where functionality of telephony logic 136 is adapted from any of a variety of conventional telecommunication techniques known in the art. Certain embodiments are not limited with respect to particular techniques whereby telephony logic 136 supports such a telecommunication exchange. The particular details of such conventional telecommunication techniques are not detailed herein in order to avoid obscuring certain features of various embodiments.

With respect to operation with a device such as accessory device 110, one problem posed by conventional telecommunication mechanisms is that, if signals are received at a smart phone or other such device via an audio connector (e.g., input 132) during a telecommunication exchange, then—by design—such signals are processed and represented as audio information in the telecommunication exchange. To provide for the communication of non-audio information via such an audio connector during a telephone conversation (but without the non-audio information interfering with the telephone conversation), certain embodiments represent such non-audio information within a frequency range that is outside of that for audio information represented by output from conventional telephony logic. For example, certain embodiments provide for signal processing at an accessory device that modulates or otherwise encodes signals—other than that generated by a microphone—for the resulting processed signals to be outside of a frequency range for audible sound that is represented in a conventional telephone communication.

Figure 2:
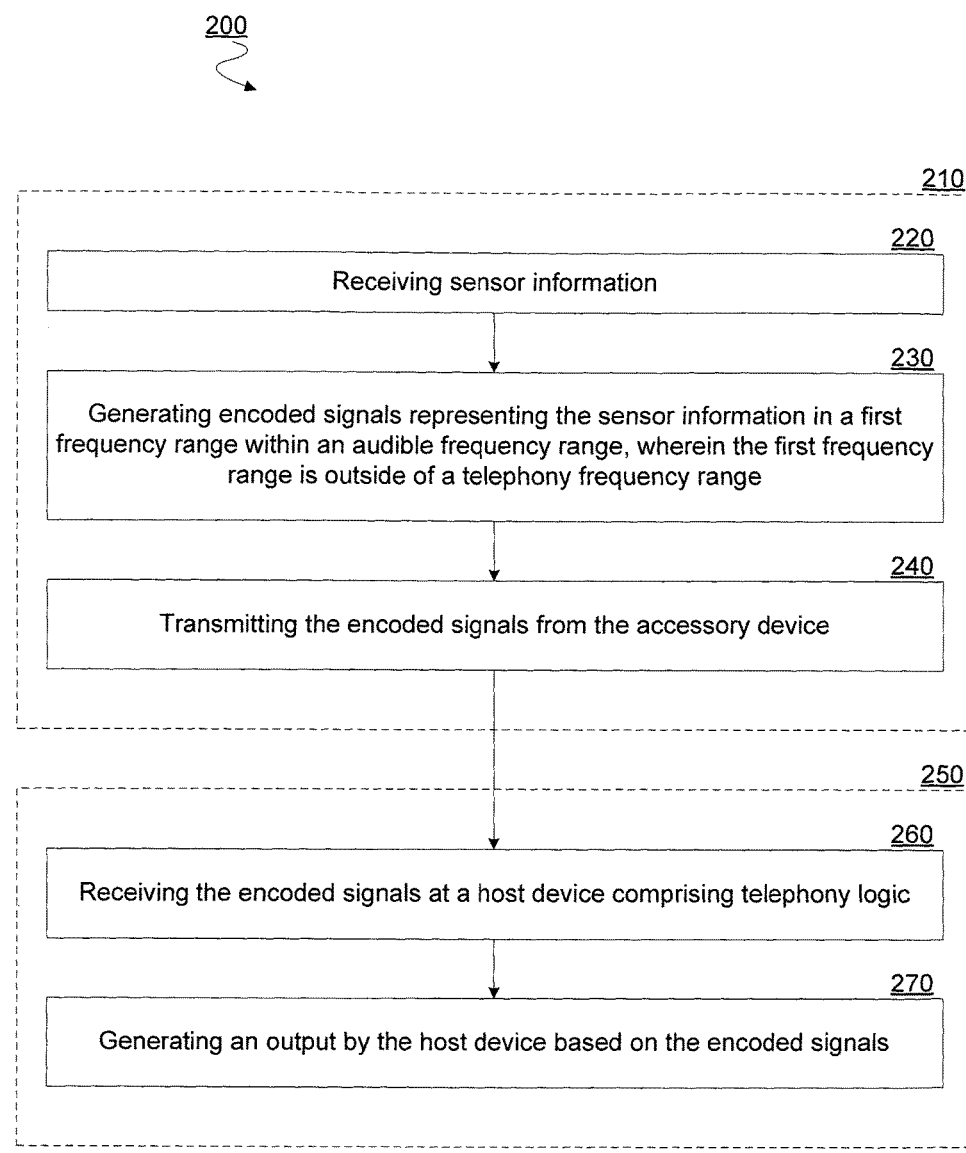
FIG. 2 is a flow diagram illustrating elements of a method for exchanging data communications according to an embodiment.

FIG. 2 illustrates elements of a method 200 for exchanging information via an audio connector according to an embodiment. Method 200 may be performed by a system comprising some or all of the features of system 100. For example, method 200 may include operations 210, performed by a device such as accessory device 110, to prepare signals for transmission via a connection that, in one or more respects, is compatible with the communication of analog audio (e.g. microphone) signals. Alternatively or in addition, method 200 may comprise operations 250 performed by a device, such as host device 130, to receive and further operate on such analog signals.

In an embodiment, operations 210 include, at 220, receiving sensor information from one or more sensors included in or coupled to the accessory device. The sensor information received 220 may include biometric information representing, for example, measurement of a body temperature, a heartbeat, a blood pressure, respiration, a brainwave activity and/or the like. Alternatively or in addition, the sensor information received at 220 may include information representing one or more characteristics of an environment proximate to the accessory device. For example, the sensor information may represent an environmental temperature, an atmospheric pressure and/or the like. In some embodiments, the sensor information includes information scanned by the accessory device from a credit card, RF ID tag or other data storage device. Although certain embodiments are not limited in this regard, the sensor information may include different respective data from various types of sensors. For example, the sensor information may include both audio information generated by a microphone and additional information generated by a different type of sensor. Certain embodiments are not limited with respect to a particular type of sensor information received at 220.

Based on the sensor information received at 220, method 200 may, at 230, generate encoded (e.g. modulated) signals representing the sensor information in a first frequency range within an audible frequency range. As used herein, "audible frequency range" refers to a range of frequencies that, for sound, are audible to the human ear. It is understood that the encoded signals themselves are not sound, but rather may include electrical signals having one or more frequencies within some frequency range for audible sound.

In an embodiment, the first frequency range is also outside of a telephony frequency range. As used herein, "telephony frequency range" refers to a range of frequencies of audio that is represented in a telecommunication exchange. The telephony frequency range may be for a class of telephony logic that may receive the encoded signals. For example, the telephony frequency range may be at least part of a range of frequencies passed by a telephony baseband chain of a host device that is to receive the encoded signals.

Generating the encoded signals that 230 and may include, for example, providing sensor information to a signal processor of the accessory device. In one embodiment, providing such sensor information may comprise providing only sensor information of one type. For example, the signal processor may receive only sensor information other than that generated by any microphone of the accessory device. In another embodiment, the providing may include providing both first sensor information generated by a microphone (included in or coupled to the accessory device) and second sensor information other than that generated by any microphone. By way of illustration and not limitation, the accessory device may include a heart monitor (or other non-microphone sensor) and a microphone. In such an embodiment, the signal processor may receive audio information generated by the microphone, and further receive information from the heart monitor representing a heart rate of the user. The signal processor may receive any of a variety of other combinations different types of sensor information, according to various embodiments.

The generating at 230 may result in at least one type of sensor information (e.g. non-microphone) being represented by components of the encoded signal that are in the first frequency range. Of those signal components that represent the one type of sensor information, substantially all of those components may be both within the audible frequency range and outside of the telephony frequency range. For example, 85% or more of the energy of such signal components may be within the first frequency range. In some embodiments, over 90% (e.g. at least 95%) of the energy of such signal components are within the first frequency range. Other levels of representation of sensor information in the first frequency range are possible, according to different embodiments.

Method 200 may further comprise, at 240, transmitting the encoded signals from the accessory device—e.g., via a microphone output or other audio connector hardware of the accessory device. In one embodiment, the encoded signals are transmitted from the accessory device to a host device—via an audio cable that is coupled to, or a component of, the accessory device. In another embodiment, the accessory device and the host device are directly and rigidly coupled to one another via respective audio connector hardware. Although certain embodiments or not limited in this regard, the audio connection between the accessory device and the host device may facilitate delivery of power from the host device to the accessory device—e.g., to power signal processing and/or other operations performed at the accessory device. However, the accessory device may additionally or alternatively generate its own power (e.g. with piezoelectric energy harvesting, one or more solar cells, etc.).

Operations 250 may comprise, at 260, receiving the encoded signals at a host device comprising telephony logic. Such telephony logic may comprise a telephony application and/or dedicated hardware such as a telephony system on chip (SOC). The host device may comprise receiver circuitry to receive signals in an audible frequency range according to conventional techniques for receiving microphone (e.g., headset) audio signals. The receiver circuitry may be coupled to provide such signals as input to the telephony logic.

In an embodiment, operations 250 include, at 270, generating an output by the host device based on the encoded signals. For example, the receiver circuitry may be further coupled to provide such received signals to logic of the host device other than the telephony logic. Such other logic may comprise an application or other software process, executed by a central processing unit (CPU), to generate a graphical, audio and/or other output which represents some or all of the sensor information—e.g., including non-microphone information—received at 260. Such a software process may demodulate signals of the first frequency range and, in some embodiment, perform calculations based on the demodulate signals to determine one or more values based on biometric, environmental, RFID and/or other sensor measurements. The one or more values may subsequently be represented by an output including sound from a speaker of the host device, one or more images presented at a display of the host device, data stored to a memory of the host device, audio information transmitted back to the accessory device via the audio connector and/or the like.

Alternatively or in addition, the generating at 270 may comprise the telephony logic processing the signals received at 260 during a telecommunication exchange between the host device and another device. Such a telecommunication exchange may, for example, take place concurrently with the receiving at 260. Due to its representation in the first frequency range, at least some sensor information may be filtered or otherwise prevented by the telephony logic from being represented as an audio signal in the telecommunication exchange. As a result, the telecommunication exchange may take place without the need for suspending concurrent execution of an application that is to generate an output based on the sensor information represented in the first frequency range.

Figure 3:
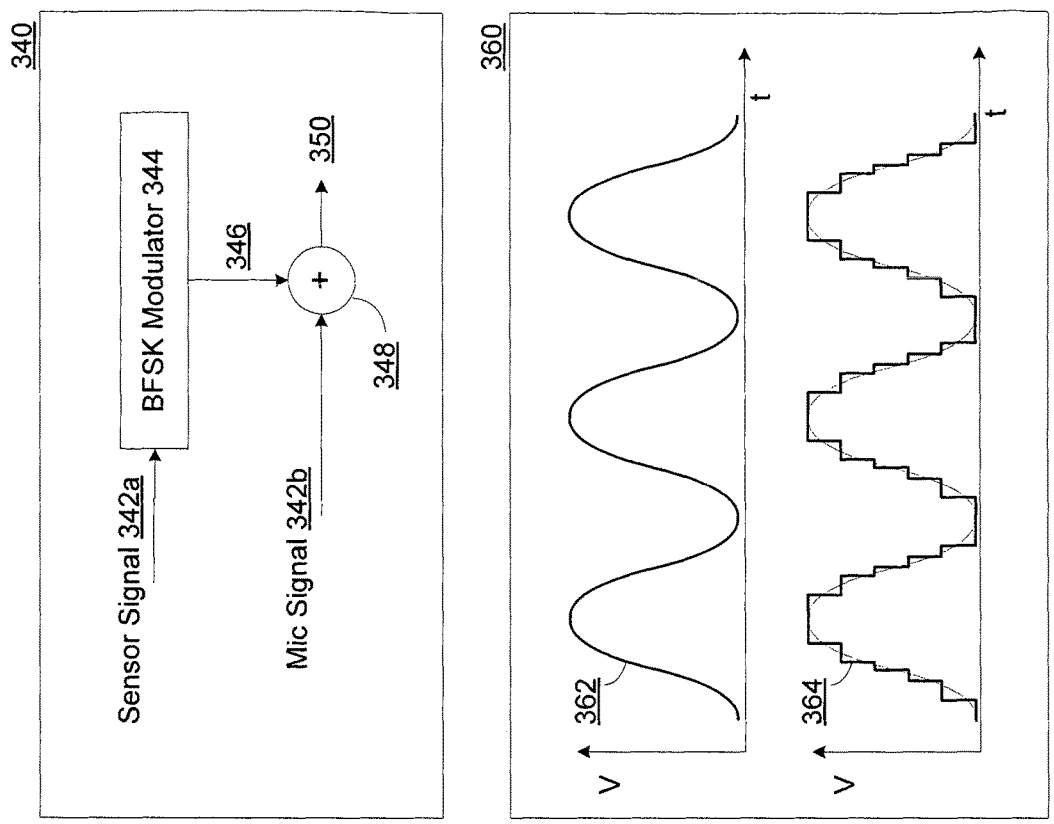
FIG. 3 is a functional block diagram illustrating elements of an input/output device for transmitting data encoded according to an embodiment.
Figure 3:
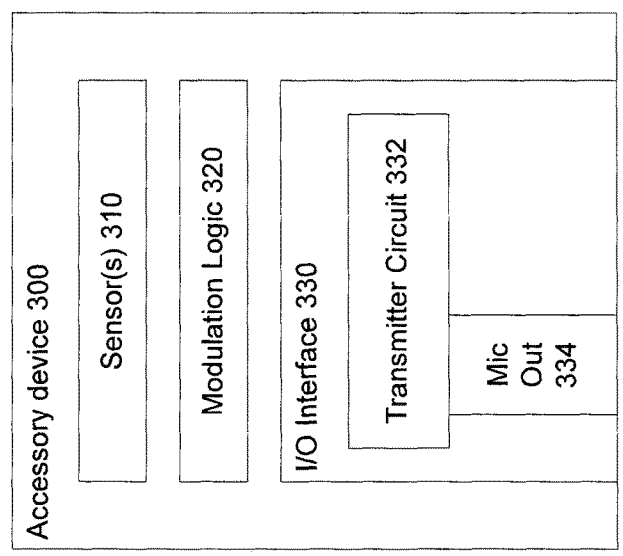

FIG. 3 illustrates elements of an accessory device 300 to provide sensor information via an audio connector according to an embodiment. Accessory device 300 may perform some or all of operations 210, for example. In an embodiment, accessory device 300 includes some or all of the features of accessory device 110. By way of illustration, accessory device 300 may include one or more sensors 310 to generate sensor information. The one or more sensors 310 may include at least one non-microphone sensor, for example. Some or all mechanisms of the one or more sensors 310 may be adapted from conventional sensor techniques, the details of which are not discussed herein to avoid obscuring certain aspects of various embodiments. In one illustrative embodiment, accessory device 300 comprises heart rate sensing ear buds operable to send heart rate information to a host device and to receive audio information from the host device.

Accessory device 300 may further comprise signal processing circuitry, represented by the illustrative modulation logic 320, to perform processing of some or all signals generated by the one or more sensors 310. Such processing may include modulating at least one type of sensor signal for some or all information represented by that signal to be represented in the first frequency range that is both within an audible frequency range and outside of a telephony frequency range.

For example, modulation logic 320 may perform a frequency-shift keying (FSK) modulation—such as a binary FSK (BFSK) modulation—of at least one type of signal from the one or more sensors 310. By way of illustration and not limitation, modulation logic 320 may comprise a BFSK modulator configured to implement two frequencies carriers (e.g. 12 kHz and 18 kHz) and a 6 kbits/s bit rate. However, such a modulator may implement, according to different embodiments, any of a variety of additional or alternative carrier frequencies and/or bit rates. Such modulation logic may be implemented with processing logic that is, very low power (e.g. running at or below a 1 MHz clock speed), as compared to circuitry for other modulation schemes. The particular circuitry of such a BFSK modulator may be adapted from conventional techniques and mechanisms, which are not detailed herein.

In one embodiment, modulation logic 320 selectively operates on one type of sensor signal and not on another type of sensor signal. For example, inset 340 shows one illustrative embodiment wherein modulation logic 320 includes a BFSK modulator 344 configured to receive a sensor signal 342a from a sensor other than any microphone of one or more sensors 310. In addition, the one or more sensors 310 may further include a microphone to generate a microphone (mic) signal 342b.

In such an embodiment, BFSK modulator 344 may modulate sensor signal 342a for representation in a first frequency range that is within an audible frequency range but outside of a telephony frequency range. However, mic signal 342b may bypass any such processing by BFSK modulator 344. Rather, mic signal 342a may be provided to an adder 348 that is to combine mic signal 342 with a BFSK modulated version 346 of sensor signals 342a. As a result, adder 348 may output a combined signal 350 for transmission from accessory device 300 via an audio connector.

Although certain embodiments are not limited in this regard, mic signal 342b may be processed prior to being provided to adder 348. By way of illustration and not limitation, mic signal 342a may be output by a filter circuit (not shown) that receives an original microphone signal generated by a microphone of one or more sensors 310. Such a filter circuit may include, for example, a low pass filter configured to remove microphone signal components that are within the first frequency range.

The signals generated by modulation logic 320 may be transmitted from accessory device 300 via hardware of an audio interface 330 comprising a transmitter circuit 332 and a mic output 334. In some embodiments, accessory device 300 receives power via I/O interface 330—e.g., including receiving such power via mic output 334. Such power may be used, for example, to power operation of modulation logic 320. Accessory device 300 may provide one or more techniques and more mechanisms in aid of providing efficient use of such power. By way of illustration and not limitation, inset 360 shows a sine wave curve of a signal 362 typically used for BFSK modulation according to conventional techniques. By contrast, a signal 364 shown in inset 360 approximates signal 362 as a step function having six discrete voltage levels. Such approximation may be achieved with more, or fewer, discrete voltage levels, in different embodiments. The particular voltage and time units of signals 362, 364, which are not shown in inset 360, are not limiting on certain embodiments. As compared to BFSK modulation with signal 362, BFSK modulation with signal 364 may be achieved by accessory device 300 with relatively simpler and/or lower power circuitry.

Certain embodiments are not limited to BFSK modulation of sensor signals by a device such as one of accessory devices 110, 300. For example, such sensor signals may be processed by Manchester encoding, phase-shift keying (PSK) modulation—e.g., binary PSK (BPSK), quadrature PSK (QPSK), etc.—or any of various other encoding schemes to represent sensor information in an audible frequency range which is outside of a telephony frequency range. These different encoding types each have respective trade-offs in terms of power requirements, bandwidth efficiency, etc.

Figure 4:
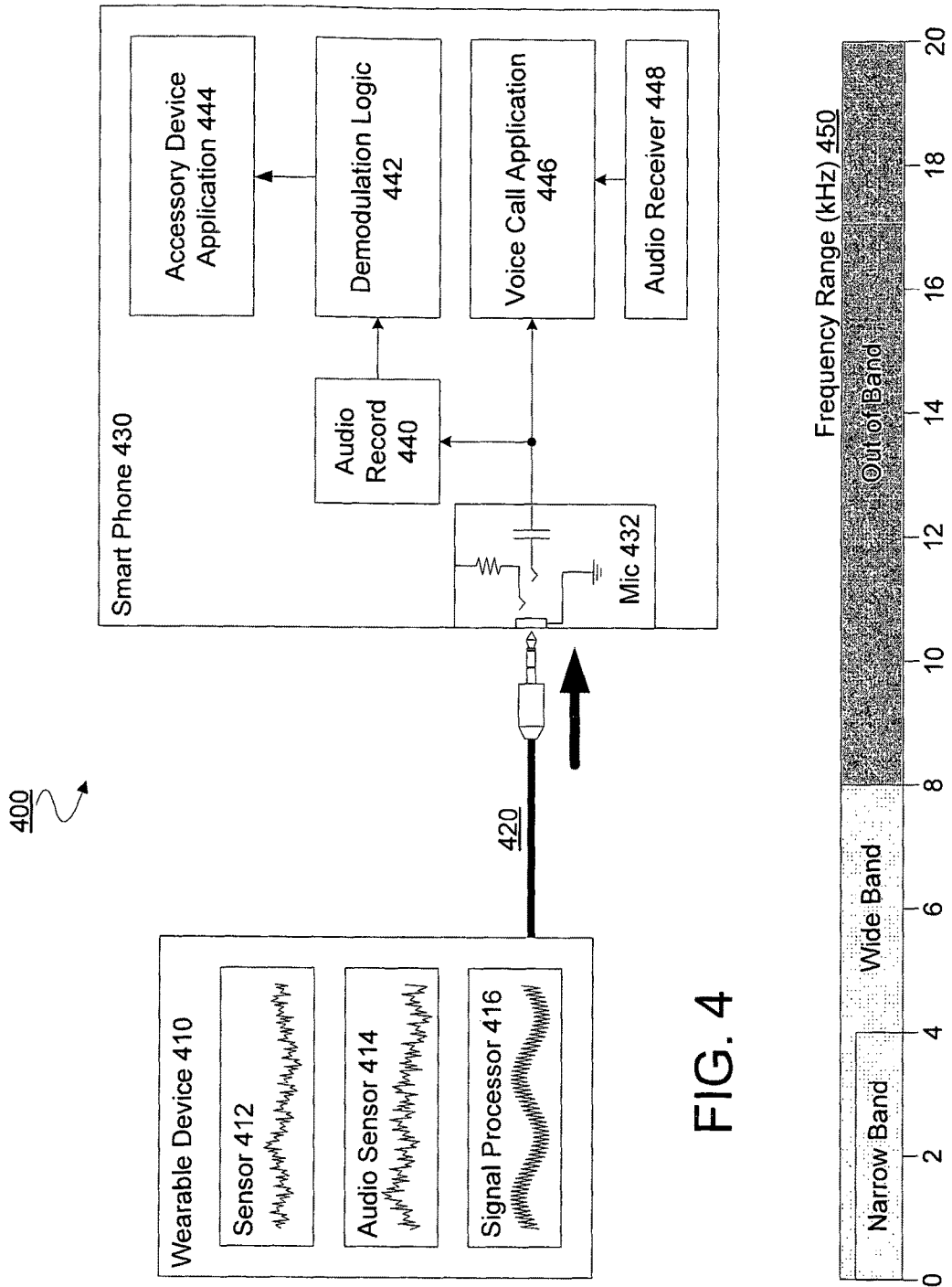
FIG. 4 is a functional block diagram illustrating elements of a system for providing data exchanges according to an embodiment.

FIG. 4 illustrates elements of the system 400 for communicating sensor information via an audio connector according to an embodiment. System 400 may be operable to perform some or all of the operations of method 200. System 400 may include some or all of the features of system 100, for example.

In an embodiment, system 400 comprises a wearable device 410 and a smart phone 430 coupled thereto via an audio connection 420. Wearable device 410 may include some or all of the features of accessory device 110 and/or accessory device 330. For example, wearable device 410 may comprise a microphone, as represented by the illustrative audio sensor 414, and a non-microphone sensor 412. A signal processor 416 of wearable device 410 may receive respective signals from sensor 412 and audio sensor 414. Processing of such signals by signal processor 416 may include modulating or otherwise encoding the signal from sensor 412 for representation in a frequency range that is within an audible frequency range, but that is also outside of a telephony frequency range.

By way of illustration and not limitation, smartphone 430 may comprise telephony logic, as represented by the illustrative voice call application 446, which is operable to facilitate a telecommunication exchange between smartphone 430 and another telephone device (not shown). Voice call application 446 may have features, typical of conventional telephony hardware and/or software, wherein audio information represented by an output from the voice call application 446 does not span the full range of sound which is audible to the human ear. For example, the frequency range 450 shown in FIG. 4 shows a typical range of passed frequencies, from 0 kHz to 4 kHz, for sound to be represented in a narrowband channel. Frequency range 450 also shows a typical range of passed frequencies, from 0 kHz to 8 kHz, for sound to be represented in a wideband channel. However, the range of frequencies from 8 kHz to 20 kHz are typically out of band for many conventional telephony techniques and mechanisms. Nevertheless, sound that is within this out-of-band range from 8 kHz to 20 kHz is audible to the human ear. Therefore, signals within a frequency range between 4 kHz and 20 Hz are within an audible frequency range but outside of one telephony frequency range—i.e., a narrow band telephony frequency range. Moreover, signals within a frequency range between 8 kHz and 20 kHz are within an audible frequency range but outside of a different telephony frequency range—i.e., a wide band telephony frequency range. The particular number of channels represented in frequency range 450, and the respective ranges covered by each such channel, are merely illustrative, and are not limitation on certain embodiments.

Signals output by signal processor 416 to be transmitted from wearable device 410 via audio connection 420 to smartphone 430. Such signals may be received by a microphone input of smart phone 430, as represented by the illustrative input Mic 432. In an embodiment, Mic 432 is coupled directly or indirectly to each of voice call application 446 and an accessory device application 444. Although certain embodiments or not limited in this regard, Mic 432 may receive such signals during a telecommunication exchange between smartphone 430 and another phone device. In such an embodiment, voice call application 446 may include in the telecommunication exchange signals representing audio information generated by audio sensor 414. Alternatively or in addition, voice call application 446 may include in the telecommunication exchange signals representing sounds detected at an audio receiver 448 integrated into smartphone 430. However, voice call application 446 may filter or otherwise prevent signals based on operation of sensor 412 from being represented in the telecommunication exchange.

Such signals based on operation of sensor 412 may also be made available to accessory device application 444. By way of illustration and not limitation, smartphone 430 may include a buffer or other storage media, represented by the illustrative audio record 440, to record signals received via Mic 440. The recorded signals may be decoded and/or otherwise processed—for example, by the illustrative demodulation logic 442—to convert signals that are outside of the telephony frequency range for subsequent processing by accessory device application 444. Signal processing by demodulation logic 440 may, in one or more respects, be inverse to that of signal processor logic 112. Processing of the recorded signals may include, for example, filtering information generated based on operation of audio sensor 414.

Figure 5:
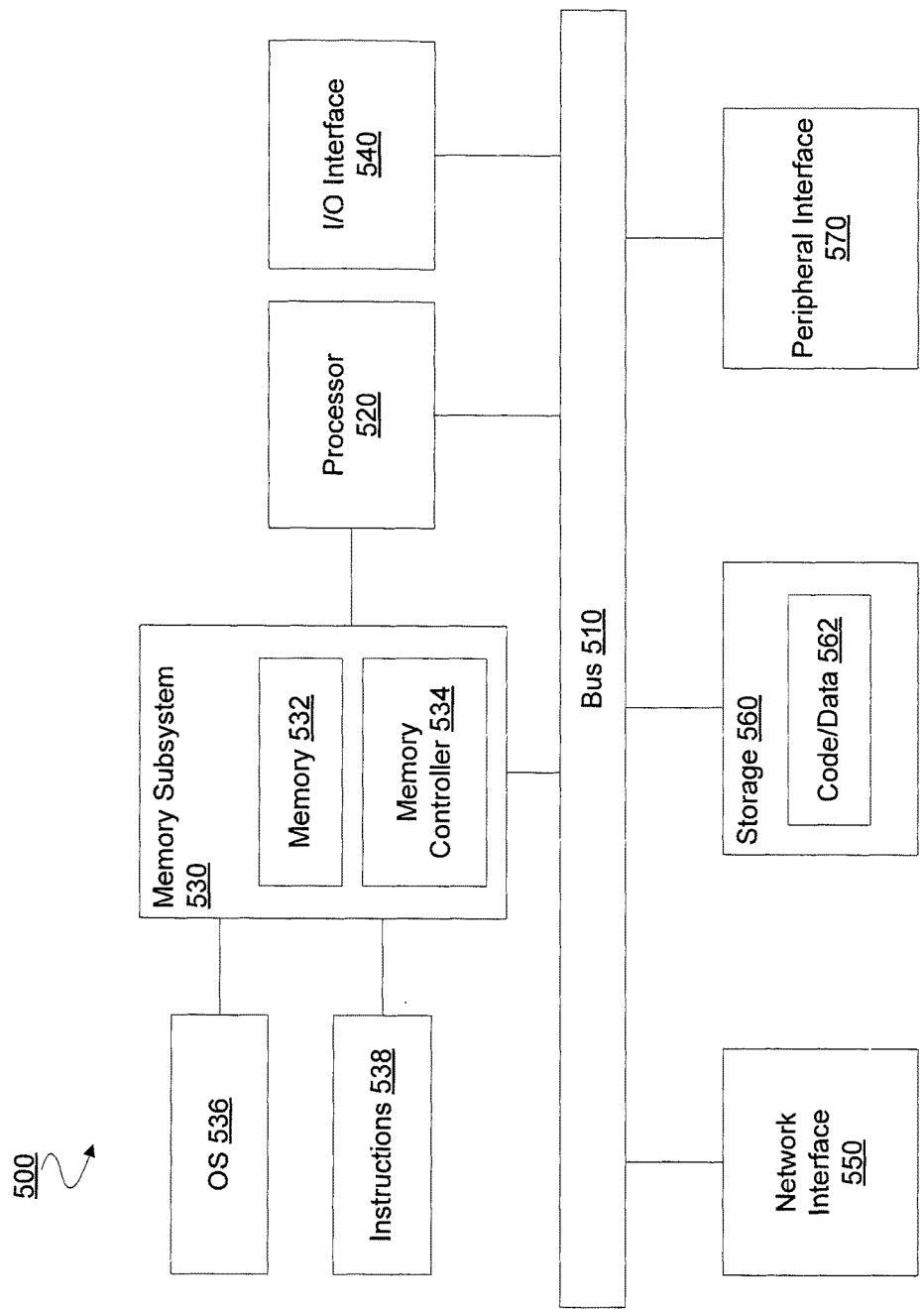
FIG. 5 is a functional block diagram illustrating elements of a computer system to communicate data via an audio connector according to an embodiment.

FIG. 5 is a block diagram of an embodiment of a computing system in which data communications may be implemented. System 500 represents a computing device in accordance with any embodiment described herein, and may be a laptop computer, a desktop computer, a server, a gaming or entertainment control system, a scanner, copier, printer, or other electronic device. System 500 may include processor 520, which provides processing, operation management, and execution of instructions for system 500. Processor 520 may include any type of microprocessor, central processing unit (CPU), processing core, or other processing hardware to provide processing for system 500. Processor 520 controls the overall operation of system 500, and may be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 530 represents the main memory of system 500, and provides temporary storage for code to be executed by processor 520, or data values to be used in executing a routine. Memory subsystem 530 may include one or more memory devices such as read-only memory (ROM), flash memory, one or more varieties of random access memory (RAM), or other memory devices, or a combination of such devices. Memory subsystem 530 stores and hosts, among other things, operating system (OS) 536 to provide a software platform for execution of instructions in system 500. Additionally, other instructions 538 are stored and executed from memory subsystem 530 to provide the logic and the processing of system 500. OS 536 and instructions 538 are executed by processor 520.

Memory subsystem 530 may include memory device 532 where it stores data, instructions, programs, or other items. In one embodiment, memory subsystem includes memory controller 534, which provides mechanisms for accessing memory device 532. In one embodiment, memory controller 534 provides commands to access memory device 532.

Processor 520 and memory subsystem 530 are coupled to bus/bus system 510. Bus 510 is an abstraction that represents any one or more separate physical buses, communication lines/interfaces, and/or point-to-point connections, connected by appropriate bridges, adapters, and/or controllers. Therefore, bus 510 may include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 510 may also correspond to interfaces in network interface 550.

System 500 may also include one or more input/output (I/O) interface(s) 540—e.g., including an audio connector—network interface 550, one or more internal mass storage device(s) 560, and peripheral interface 570 coupled to bus 510. I/O interface 540 may include one or more interface components through which a user interacts with system 500 (e.g., video, audio, and/or alphanumeric interfacing). Network interface 550 provides system 500 the ability to communicate with remote devices (e.g., servers, other computing devices) over one or more networks. Network interface 550 may include an Ethernet adapter, wireless interconnection components, USB (universal serial bus), or other wired or wireless standards-based or proprietary interfaces.

Storage 560 may be or include any conventional medium for storing large amounts of data in a nonvolatile manner, such as one or more magnetic, solid state, or optical based disks, or a combination. Storage 560 holds code or instructions and data 562 in a persistent state (i.e., the value is retained despite interruption of power to system 500). Storage 560 may be generically considered to be a "memory," although memory 530 is the executing or operating memory to provide instructions to processor 520. Whereas storage 560 is nonvolatile, memory 530 may include volatile memory (i.e., the value or state of the data is indeterminate if power is interrupted to system 500).

Peripheral interface 570 may include any hardware interface not specifically mentioned above. Peripherals refer generally to devices that connect dependently to system 500. A dependent connection is one where system 500 provides the software and/or hardware platform on which an operation executes, and with which a user interacts.

Figure 6:
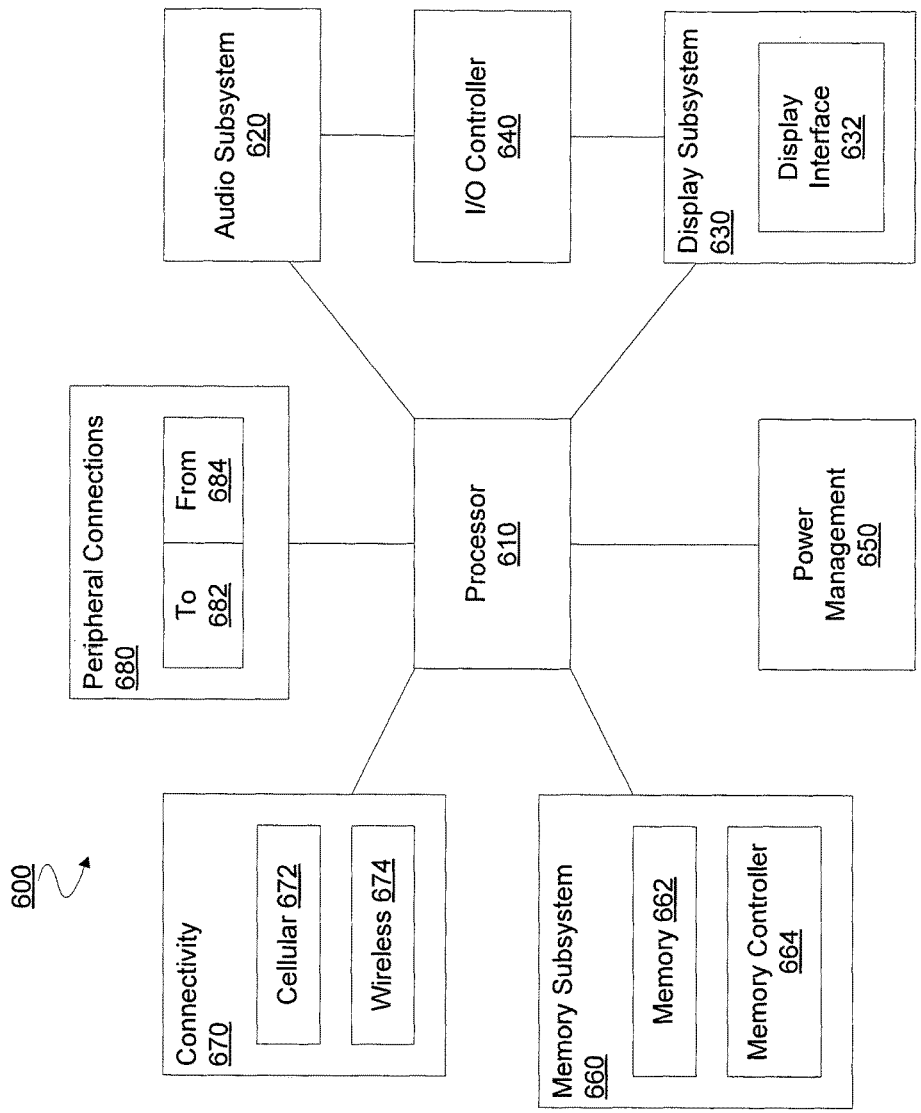
FIG. 6 is a functional block diagram illustrating elements of a mobile device to communicate data via an audio connector according to an embodiment.

FIG. 6 is a block diagram of an embodiment of a mobile device in which data communications may be implemented. Device 600 represents a mobile computing device, such as a computing tablet, a mobile phone or smartphone, a wireless-enabled e-reader, or other mobile device. It will be understood that certain of the components are shown generally, and not all components of such a device are shown in device 600.

Device 600 may include processor 610, which performs the primary processing operations of device 600. Processor 610 may include one or more physical devices, such as microprocessors, application processors, microcontrollers, programmable logic devices, or other processing means. The processing operations performed by processor 610 include the execution of an operating platform or operating system on which applications and/or device functions are executed. The processing operations include operations related to I/O (input/output) with a human user or with other devices, operations related to power management, and/or operations related to connecting device 600 to another device. The processing operations may also include operations related to audio I/O and/or display I/O.

In one embodiment, device 600 includes audio subsystem 620, which represents hardware (e.g., audio hardware and audio circuits) and software (e.g., drivers, codecs) components associated with providing audio functions to the computing device. Audio functions may include speaker and/or headphone output, as well as microphone input. Devices for such functions may be integrated into device 600, or connected to device 600. In one embodiment, a user interacts with device 600 by providing audio commands that are received and processed by processor 610.

Display subsystem 630 represents hardware (e.g., display devices) and software (e.g., drivers) components that provide a visual and/or tactile display for a user to interact with the computing device. Display subsystem 630 may include display interface 632, which may include the particular screen or hardware device used to provide a display to a user. In one embodiment, display interface 632 includes logic separate from processor 610 to perform at least some processing related to the display. In one embodiment, display subsystem 630 includes a touchscreen device that provides both output and input to a user.

I/O controller 640 represents hardware devices and software components related to interaction with a user. I/O controller 640 may operate to manage hardware that is part of audio subsystem 620 and/or display subsystem 630. Additionally, I/O controller 640 illustrates a connection point for additional devices that connect to device 600 through which a user might interact with the system. For example, devices that may be attached to device 600 might include microphone devices, speaker or stereo systems, video systems or other display device, keyboard or keypad devices, or other I/O devices for use with specific applications such as card readers or other devices.

As mentioned above, I/O controller 640 may interact with audio subsystem 620 and/or display subsystem 630. For example, input through a microphone or other audio device may provide input or commands for one or more applications or functions of device 600. Additionally, audio output may be provided instead of or in addition to display output. In another example, if display subsystem includes a touchscreen, the display device also acts as an input device, which may be at least partially managed by I/O controller 640. There may also be additional buttons or switches on device 600 to provide I/O functions managed by I/O controller 640.

In one embodiment, I/O controller 640 manages devices such as accelerometers, cameras, light sensors or other environmental sensors, gyroscopes, global positioning system (GPS), or other hardware that may be included in device 600. The input may be part of direct user interaction, as well as providing environmental input to the system to influence its operations (such as filtering for noise, adjusting displays for brightness detection, applying a flash for a camera, or other features).

In one embodiment, device 600 includes power management 650 that manages battery power usage, charging of the battery, and features related to power saving operation. Memory subsystem 660 may include memory device(s) 662 for storing information in device 600. Memory subsystem 660 may include nonvolatile (state does not change if power to the memory device is interrupted) and/or volatile (state is indeterminate if power to the memory device is interrupted) memory devices. Memory 660 may store application data, user data, music, photos, documents, or other data, as well as system data (whether long-term or temporary) related to the execution of the applications and functions of system 600. In one embodiment, memory subsystem 660 includes memory controller 664 (which could also be considered part of the control of system 600, and could potentially be considered part of processor 610) to control memory 662.

Connectivity 670 may include hardware devices (e.g., wireless and/or wired connectors and communication hardware) and software components (e.g., drivers, protocol stacks) to enable device 600 to communicate with external devices. The device could be separate devices, such as other computing devices, wireless access points or base stations, as well as peripherals such as headsets, printers, or other devices.

Connectivity 670 may include multiple different types of connectivity. To generalize, device 600 is illustrated with cellular connectivity 672 and wireless connectivity 674. Cellular connectivity 672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 674 refers to wireless connectivity that is not cellular, and may include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 680 include hardware interfaces and connectors—e.g., including an audio connector—as well as software components (e.g., drivers, protocol stacks) to make peripheral connections. It will be understood that device 600 could both be a peripheral device ("to" 682) to other computing devices, as well as have peripheral devices ("from" 684) connected to it. Device 600 commonly has a "docking" connector to connect to other computing devices for purposes such as managing (e.g., downloading and/or uploading, changing, synchronizing) content on device 600. Additionally, a docking connector may allow device 600 to connect to certain peripherals that allow device 600 to control content output, for example, to audiovisual or other systems.

In addition to a proprietary docking connector or other proprietary connection hardware, device 600 may make peripheral connections 680 via common or standards-based connectors. Common types may include a Universal Serial Bus (USB) connector (which may include any of a number of different hardware interfaces), DisplayPort including MiniDisplayPort (MDP), High Definition Multimedia Interface (HDMI), Firewire, or other type.

In one implementation, an apparatus comprises an audio connector to couple the apparatus to a mobile device, one or more sensors configured to generate sensor information, signal processor logic comprising circuitry configured to the receive sensor information and to generate encoded signals to represent the sensor information in a first frequency range, wherein the first frequency range is within an audible frequency range and outside of a telephony frequency range of the mobile device, and transmitter circuitry to transmit the encoded signals to the mobile device via the audio connector.

In an embodiment, the mobile device is to provide power to the apparatus via the audio connector, wherein the signal processor logic is to generate the encoded signals with the power. In another embodiment, the signal processor logic to generate the encoded signals comprises the signal processor logic to perform frequency-shift keying modulation of signals from the one or more sensors. In an embodiment, the frequency-shift keying modulation of signals comprises binary frequency-shift keying modulation based on an approximation of a sine wave signal.

In an embodiment, the audible frequency range is within a range from 4 kHz to 20 kHz. In an embodiment, the audible frequency range is within a range from 8 kHz to 20 kHz. In an embodiment, the telephony frequency range is a wide band channel frequency range of the mobile device. In an embodiment, the wide band channel frequency range is within a range from 20 Hz to 8 kHz. In an embodiment, the telephony frequency range is a narrow band channel frequency range of the mobile device. In an embodiment, the narrow band channel frequency range is within a range from 20 Hz to 4 kHz.

In an embodiment, the signal processor logic to generate the encoded signals comprises the signal processor logic to modulate first signals from a sensor other than any microphone of the one or more sensors. In an embodiment, the signal processor logic to generate the encoded signals further comprises the signal processor logic to combine the modulated first signals with second signals from a microphone of the one or more sensors. In an embodiment, the signal processor logic to generate the encoded signals further comprises the signal processor logic to output the second signals from a filter circuit before the modulated first signals are combined with the second signals. In an embodiment, the sensor information comprises biometric information. In an embodiment, the biometric information represents a heartbeat measurement.

In another implementation, a method at an accessory device coupled to a mobile device comprises receiving sensor information from one or more sensors of the accessory device, generating encoded signals to represent the sensor information in a first frequency range, wherein the first frequency range is within an audible frequency range and outside of a telephony frequency range of the mobile device, and transmitting the encoded signals to the mobile device via an audio connector of the accessory device.

In an embodiment, the method further comprises receiving power from the mobile device via the audio connector, wherein generating the encoded signals is performed with the power. In another embodiment, generating the encoded signals comprises performing frequency-shift keying modulation of signals from the one or more sensors. In another embodiment, the frequency-shift keying modulation of signals comprises binary frequency-shift keying modulation based on an approximation of a sine wave signal.

In another embodiment, the audible frequency range is within a range from 4 kHz to 20 kHz. In another embodiment, the audible frequency range is within a range from 8 kHz to 20 kHz. In another embodiment, the telephony frequency range is a wide band channel frequency range of the mobile device. In another embodiment, the wide band channel frequency range is within a range from 20 Hz to 8 kHz. In another embodiment, the telephony frequency range is a narrow band channel frequency range of the mobile device. In another embodiment, the narrow band channel frequency range is within a range from 20 Hz to 4 kHz.

In another embodiment, generating the encoded signals comprises modulating first signals from a sensor other than any microphone of the one or more sensors. In another embodiment, generating the encoded signals further comprises combining the modulated first signals with second signals from a microphone of the one or more sensors. In another embodiment, generating the encoded signals further comprises outputting the second signals from a filter circuit before the modulated first signals are combined with the second signals. In another embodiment, the sensor information comprises biometric information. In another embodiment, the biometric information represents a heartbeat measurement.

In another implementation, a mobile device comprises telephony logic comprising circuitry configured to participate in a telecommunication exchange with a remote device, an audio connector to couple the mobile device to an accessory device other than the remote device, and receiver circuitry coupled to receive via the audio connector encoded signals from the accessory device during the telephony exchange, wherein the encoded signals represent sensor information in a first frequency range, and wherein the first frequency range is within an audible frequency range and outside of a telephony frequency range of the telephony logic, wherein the receiver circuitry to provide the encoded signals to the telephony logic during the telephony exchange.

In an embodiment, the mobile device further comprises logic to decode the encoded signals and to generate an audio output or a graphical output based on the sensor information. In another embodiment, the mobile device is to provide power to the accessory device via the audio connector. In another embodiment, the encoded signals comprise binary frequency-shift keying modulated signals.

In another embodiment, the audible frequency range is within a range from 4 kHz to 20 kHz. In another embodiment, the audible frequency range is within a range from 8 kHz to 20 kHz. In another embodiment, the telephony frequency range is a wide band channel frequency range of the telephony logic. In another embodiment, the wide band channel frequency range is within a range from 20 Hz to 8 kHz. In another embodiment, the telephony frequency range is a narrow band channel frequency range of the telephony logic. In another embodiment, the narrow band channel frequency range is within a range from 20 Hz to 4 kHz. In another embodiment, the sensor information comprises biometric information. In another embodiment, the biometric information represents a heartbeat measurement.

In another implementation, a method at a mobile device comprises, with telephony logic of the mobile device, participating in a telecommunication exchange with a remote device, and during the telecommunication exchange, receiving via an audio connector of the mobile device encoded signals from an accessory device other than the remote device, wherein the encoded signals represent sensor information in a first frequency range, and wherein the first frequency range is within an audible frequency range and outside of a telephony frequency range of telephony logic of the mobile device. The method further comprises providing the encoded signals to the telephony logic of the mobile device during the telephony exchange.

In an embodiment, the method further comprises decoding the encoded signals, and generating an audio output or a graphical output based on the sensor information. In another embodiment, the method further comprises providing power to the accessory device via the audio connector. In another embodiment, the encoded signals comprise binary frequency-shift keying modulated signals.

In another embodiment, the audible frequency range is within a range from 4 kHz to 20 kHz. In another embodiment, the audible frequency range is within a range from 8 kHz to 20 kHz. In another embodiment, the telephony frequency range is a wide band channel frequency range of the telephony logic. In another embodiment, the wide band channel frequency range is within a range from 20 Hz to 8 kHz. In another embodiment, the telephony frequency range is a narrow band channel frequency range of the telephony logic. In another embodiment, the narrow band channel frequency range is within a range from 20 Hz to 4 kHz. In another embodiment, the sensor information comprises biometric information. In another embodiment, the biometric information represents a heartbeat measurement.

In another implementation, a computer-readable storage medium has stored thereon instructions which, when executed by one or more processing units, cause the one or more processing units to perform a method at an accessory device coupled to a mobile device, the method comprising receiving sensor information from one or more sensors of the accessory device, generating encoded signals to represent the sensor information in a first frequency range, wherein the first frequency range is within an audible frequency range and outside of a telephony frequency range of the mobile device, and transmitting the encoded signals to the mobile device via an audio connector of the accessory device.

In an embodiment, the method further comprises receiving power from the mobile device via the audio connector, wherein generating the encoded signals is performed with the power. In another embodiment, generating the encoded signals comprises performing frequency-shift keying modulation of signals from the one or more sensors. In another embodiment, the frequency-shift keying modulation of signals comprises binary frequency-shift keying modulation based on an approximation of a sine wave signal.

In another embodiment, the audible frequency range is within a range from 4 kHz to 20 kHz. In another embodiment, the audible frequency range is within a range from 8 kHz to 20 kHz. In another embodiment, the telephony frequency range is a wide band channel frequency range of the mobile device. In another embodiment, the wide band channel frequency range is within a range from 20 Hz to 8 kHz. In another embodiment, the telephony frequency range is a narrow band channel frequency range of the mobile device. In another embodiment, the narrow band channel frequency range is within a range from 20 Hz to 4 kHz. In another embodiment, generating the encoded signals comprises modulating first signals from a sensor other than any microphone of the one or more sensors. In another embodiment, generating the encoded signals further comprises combining the modulated first signals with second signals from a microphone of the one or more sensors. In another embodiment, generating the encoded signals further comprises outputting the second signals from a filter circuit before the modulated first signals are combined with the second signals. In another embodiment, wherein the sensor information comprises biometric information. In another embodiment, wherein the biometric information represents a heartbeat measurement.

Techniques and architectures for exchanging data with an audio input hardware are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus comprising:
an audio connector to couple the apparatus to a microphone input of a mobile device;
a plurality of sensors, wherein at least one of the sensors is an audio sensor configured to generate audio information and the other sensor configured to generate sensor information related to a detected state of a user or an environment of the user;

signal processor logic comprising circuitry configured to receive the sensor information and to generate encoded signals to represent the sensor information as non-audio information in a first frequency range and to generate non-encoded signals to represent the audio information, wherein the first frequency range is outside of a telephony frequency range for telephone voice communication of the mobile device; and transmitter circuitry to transmit the encoded signals representing the sensor information and non-encoded signals representing the audio information to the mobile device via the audio connector and microphone input of the mobile device, and wherein the encoded signals representing the sensor information do not interfere with telephone voice communication of the mobile device.

2. The apparatus of claim 1, wherein the mobile device to provide power to the apparatus via the audio connector, and wherein the signal processor logic to generate the encoded signals with the power.

3. The apparatus of claim 1, wherein the signal processor logic to generate the encoded signals comprises the signal processor logic to perform frequency-shift keying modulation of signals from one or more sensors generating sensor information.

4. The apparatus of claim 3, wherein the frequency-shift keying modulation of signals comprises binary frequency-shift keying modulation based on an approximation of a sine wave signal.

5. The apparatus of claim 1, wherein the telephony frequency range is a wide band channel frequency range of the mobile device.

6. The apparatus of claim 5, wherein the wide band channel frequency range is within a range from 20 Hz to 8 kHz.

7. The apparatus of claim 1, wherein the telephony frequency range is a narrow band channel frequency range of the mobile device.

8. The apparatus of claim 7, wherein the narrow band channel frequency range is within a range from 20 Hz to 4 kHz.

9. The apparatus of claim 1, wherein the signal processor logic to generate the encoded signals comprises the signal processor logic to modulate first signals from a sensor other than an audio sensor.

10. The apparatus of claim 9, wherein the signal processor logic to generate the encoded signals further comprises the signal processor logic to combine the modulated first signals with second signals from an audio sensor.

11. The apparatus of claim 10, wherein the signal processor logic to generate the encoded signals further comprises the signal processor logic to output the second signals from a filter circuit before the modulated first signals are combined with the second signals.

12. The apparatus of claim 1, wherein the sensor information comprises biometric information of the user.

13. A method at an accessory device coupled to a mobile device, the method comprising:
receiving sensor information from a plurality of sensors of the accessory device, wherein at least one of the sensors is an audio sensor configured to generate audio information and the other sensor configured to generate sensor information related to a detected state of a user or an environment of the user;

generating encoded signals to represent the sensor information as non-audio information in a first frequency range and non-encoded signals to represent the audio information, wherein the first frequency range is outside of a telephony frequency range for telephone voice communication of the mobile device; and transmitting the encoded signals representing the sensor information and non-encoded signals representing the audio information to the mobile device via an audio connector of the accessory device coupled to a microphone input of the mobile device, wherein the encoded signals representing the sensor information do not interfere with telephone voice communication of the mobile device.

14. The method of claim 13, further comprising receiving power from the mobile device via the audio connector, wherein generating the encoded signals is performed with the power.

15. The method of claim 13, wherein generating the encoded signals comprises performing frequency-shift keying modulation of signals from the one or more sensors.

16. The method of claim 13, wherein generating the encoded signals comprises modulating first signals from a sensor other than an audio sensor.

17. The method of claim 16, wherein generating the encoded signals further comprises combining the modulated first signals with second signals from an audio sensor.

18. A mobile device comprising:
telephony logic comprising circuitry configured to participate in a telecommunication exchange with a remote device;

an audio connector to couple with a microphone input of the mobile device to an accessory device other than the remote device; and receiver circuitry coupled to receive via the audio connector encoded signals and non-encoded signals from the accessory device during the telephony exchange, wherein the encoded signals represent sensor information related to a detected state of a user or environment of the user as non-audio information in a first frequency range and the non-encoded signals represent audio information, and wherein the first frequency range is outside of a telephony frequency range of the telephony logic, wherein the receiver circuitry to provide the encoded signals representing the sensor information and non-encoded signals representing audio information to the telephony logic during the telephony exchange without the encoded signals representing the sensor information interfering with the telephony exchange of the mobile device.

19. The mobile device of claim 18, further comprising:
logic to decode the encoded signals and to generate an audio output or a graphical output based on the sensor information.

20. A method at a mobile device, the method comprising:
with telephony logic of the mobile device, participating in a telecommunication exchange with a remote device;

during the telecommunication exchange, receiving via an audio connector and a microphone input of the mobile device encoded signals from an accessory device other than the remote device and non-encoded signals, wherein the encoded signals represent sensor information related to a detected state of a user or an environment of the user as non-audio information in a first frequency range and the non-encoded signals represent audio information, and wherein the first frequency range is outside of a telephony frequency range of telephony logic of the mobile device; and providing the encoded signals representing the sensor information and the non-encoded signals representing the audio information to the telephony logic of the mobile device during the telephony exchange without the encoded signals representing the sensor information interfering with the telephony exchange of the mobile device.

21. The method of claim 20, further comprising:
decoding the encoded signals; and
generating an audio output or a graphical output based on the sensor information.

22. The method of claim 20, wherein the encoded signals comprise binary frequency-shift keying modulated signals.

23. A non-transitory computer-readable storage medium having stored thereon instructions which, when executed by one or more processing units, cause the one or more processing units to perform a method at an accessory device coupled to a mobile device, the method comprising:

receiving sensor information and audio information from one or more sensors of the accessory device, the sensor information related to a detected state of a user or an environment of the user;

generating encoded signals to represent the sensor information as non-audio information in a first frequency range and non-encoded signals to represent the audio information, wherein the first frequency range is outside of a telephony frequency range for telephone voice communication of the mobile device; and transmitting the encoded signals representing the sensor information and non-encoded signals representing the audio information to the mobile device via an audio connector of the accessory device and microphone input of the mobile device, and wherein the encoded signals representing the sensor information do not interfere with telephone voice communication of the mobile device.

24. The non-transitory computer-readable storage medium of claim 23, wherein generating the encoded signals comprises performing frequency-shift keying modulation of signals from the one or more sensors.

25. The non-transitory computer-readable storage medium of claim 23, wherein generating the encoded signals comprises modulating first signals from a sensor other than an audio sensor.

* * * * *